United States Patent

Main, Jr.

[15] 3,645,416
[45] Feb. 29, 1972

[54] TANK BAFFLE

[72] Inventor: Robert Main, Jr., Hutchinson, Kans.

[73] Assignee: Deluxe Specialties Manufacturing Company, Inc., Hutchinson, Kans.

[22] Filed: Sept. 16, 1969

[21] Appl. No.: 858,447

[52] U.S. Cl. ............................................................220/22
[51] Int. Cl. ................................................................B65d 25/04
[58] Field of Search ............................220/20, 22, 77; 220/20, 22, 220/77

[56] References Cited

UNITED STATES PATENTS 2,195,074  3/1940  Billig.........................................220/22

FOREIGN PATENTS OR APPLICATIONS 466,367  10/1927  Germany.................................220/22

Primary Examiner—George E. Lowrance
Attorney—Gregory J. Nelson

[57] ABSTRACT

A tank or container for liquid especially adapted to withstand repeated high internal pressure resulting from movement of the liquid therein. One or more pairs of baffles are arranged in parallel within the tank. Each baffle is of a general arch shape preferably having a flat section disposed transversely in said tank perpendicular to the longitudinal axis of the tank with an angular flanged section at both the top and bottom edge. The edges of the flanges are affixed to the tank top and bottom, respectively, leaving the opposite sides free to flex against the tank walls opposing the tendency of the tank to collapse in response to internal pressure forces resulting from movement in liquid.

6 Claims, 3 Drawing Figures

PATENTED FEB 29 1972

3,645,416

INVENTOR.
ROBERT MAIN, JR.
BY Gregory J. Nelson
ATTORNEY

TANK BAFFLE

BACKGROUND OF THE INVENTION

The invention relates to tanks for containing liquids and more particularly a novel baffle arrangement to withstand internal shock pressure loads. More particularly my invention relates to a baffled fuel tank design suitable for use in boats, aircraft and vehicles.

Liquid tanks, such as fuel tanks for boats, airplanes, and vehicles, undergo severe surging during movement. The movement and sloshing of the liquid creates high internal pressure forces and moments. To further add to the problem, these forces and pressures are repeatedly imposed, as in the case of a boat bouncing across waves, causing the tank walls and ends to eventually experience fatigue failure or failure of the mechanical joints.

A commonly suggested solution to the problem in the prior art has been to provide various internal baffling arrangements. For example, partitions have been included to compartment the interior of the tank. This requires separate means in each compartment to fill and empty the entire tank. Similarly, it has been suggested to provide baffles with cutaway sections that are affixed, as by welding or riveting, to all the interior sides of the tank. This method, although serving to somewhat reduce internal stresses imposed by sloshing, is not entirely effective as the baffle itself, due to its attachment, will cause failure at the point of attachment.

Variations of this design may be found such as the elimination of welds and rivets by the use of channels in the tanks interior walls which are adapted to receive and secure the internal baffle. Further, it has been suggested in the prior art to insulate an internal deflecting baffle from the tank wall through resilient fastening means which will not transmit strain to the tank walls. It has been my experience that none of these designs satisfactorily act to oppose internal forces caused by a liquid being confined within a moving tank.

SUMMARY OF THE INVENTION

My novel design consists in providing at least one pair of baffles within the tank which cooperate to oppose the forces imposed by movement of fluid. The baffles are of a general arch shape with the exterior edges being in back-to-back relationship. Each baffle is perforate, permitting flow therethrough or around, and is not continuously joined at its edge to the tank wall. Upon application of internal pressure the baffles flex, applying thrust against the tank walls, opposing the tendency of the walls to collapse.

Accordingly, it is a broad object of my invention to provide a novel internal baffling arrangement for tanks.

Another object of my invention is to provide a tank baffling arrangement which is responsive to internal pressure to tend to oppose the stresses placed upon tank walls due to movement of liquid therein.

Still another object of my invention is the provision of a tank baffling arrangement including at least a pair of baffles which are joined to the tank interior walls only at preselected sections to permit proper flexing.

Another object of this invention is to provide a cooperating pair of flexible tank baffles, each of which is generally arch shaped and spans the tank interior so that internal pressure against the baffles is resolved into a thrust component which opposes the tendency of the tank to collapse.

A broad object is the provision of a low-cost, easily manufactured tank, that can withstand higher loads due to surging and sloshing tanks than can conventional tanks of comparable gauge metal.

A further object of the invention is to provide an extremely strong and durable tank in which the baffles do not tend to break from the tank wall at their point of attachment.

A specific object is to provide a strong, shock-resistant fuel tank for boats and other moving carriers.

Other objects and advantages of the present invention will become apparent from the following drawings and specification in which.

Figure 1:
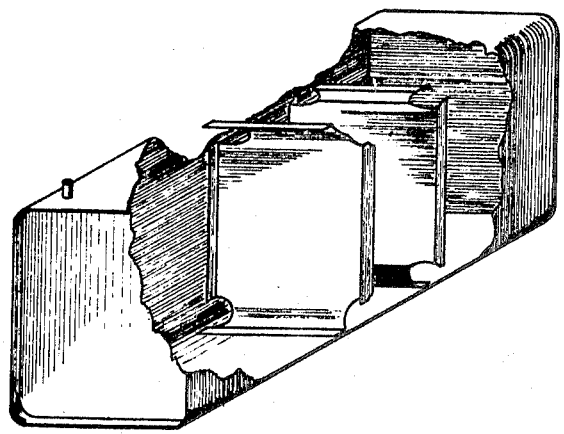
FIG. 1 is a perspective view of a tank cutaway to illustrate baffles according to the present invention.

Turning to the drawings, the tank is broadly designated by the numeral 10 and is shown as being generally rectangular in cross section having ends 11, sidewalls 12, and top and bottom sections 13 and 14, respectively. Vented filler cap 18 is provided for filling and emptying the contents of the tank. As is standard, the ends or heads 11 are of the internal dish type and may be welded or riveted to the side and top and bottom walls which is formed from one sheet and longitudinally welded. It should be noted that the generally rectangular elongated tank is shown only for purposes of illustration and the invention would apply equally well to tanks of various cross section and length.

A pair of baffles 15 and 16 are transversely arranged within the tank perpendicular to the longitudinal axis of the tank. Preferably these baffles are symmetrically arranged, each offset from the center of the tank toward the end the same approximate distance. In tanks having greater length, I have found it advisable to arrange several or more pairs of baffles symmetrically within the tank. As a general rule in highly stressed tanks of more than 4-foot length, additional pairs of baffles may be necessary.

Figure 2:
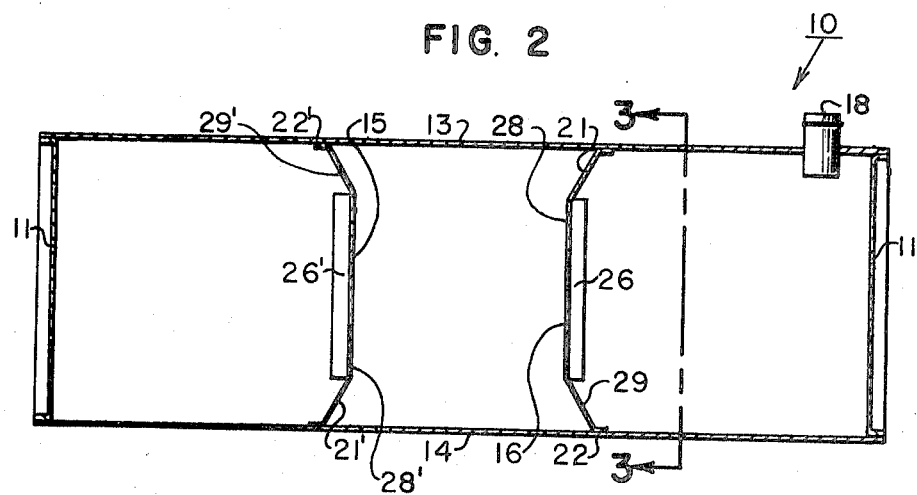
FIG. 2 is a longitudinal section view of the tank of FIG. 1.
Figure 3:
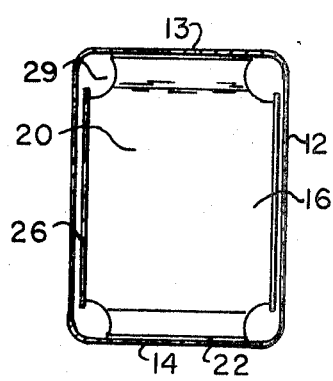
FIG. 3 is a section along line 3—3 of FIG. 2, further showing the baffle in detail.

Looking at FIGS. 2 and 3, it will be seen that each baffle has a generally arch-shaped cross section. For example, baffle 16 has a generally rectangular face 20, arranged parallel to ends 11. The top and bottom edges of face 20 are formed with an angular section 21 which terminate adjacent the tank top and bottom completing the arch shape. Flanges 22 extend from the terminal ends of flanges 21 and are arranged parallel to the top and bottom of the tank and are affixed to the tank top and bottom along their entire length as by suitable spot welds. Flanges 22 are not necessary to the operation of the baffles but are only convenient means of providing adequate surface area for spot welding or other bonding methods.

The side edges of the face 20 of baffle 16 are formed into right-angle flanges 26 which are adjacent and parallel to tank sidewalls 12. It should be carefully noted that side flanges 26 are not affixed to the tank sidewalls but simply abut or are adjacent thereto to provide a wear surface area against which the tank sidewalls may flex. The four corners of each baffle have been cut away at 29 to provide for flow of liquid therethrough as well as around flanged edge 26.

Baffle 15 is constructed the same as baffle 16 and similar structural elements are designated by identical numerals but further identified with a prime (') mark. As explained above, the baffles are arranged within the tank interior in pairs transversely and perpendicular to the longitudinal axis of the tank. Thus, there is provided a pair of cooperating opposed baffles 15 and 16 which are flexible and deformable as they are affixed only along opposite sides in one dimension. The opposite sides along the planar dimension, the tank sidewalls in this example, are free. The baffles are arranged in a back-to-back relationship with the exterior surfaces 28 and 28' of the arch adjacent. The interior surfaces 29 and 29' face in opposite directions.

The term "arch shaped" as applied to the cross-sectional configuration of the baffles as described herein is used broadly to describe any shape which is curved to span the tank interior as a support by resolving internal pressure forces into thrust. The shape of the baffles in the accompanying drawings, which are formed having a flat surface flanged at either end, is considered "arch shaped" and it will be obvious to those skilled in the art to substitute, for example, a bowed or curved baffle spanning the tank and affixed thereto at either end of the span.

Observing unbaffled tanks or tanks having baffles secured around all sides, I have found that when the liquid-filled tank is subjected to impact, the sides and ends tend to move repeatedly outwardly and inwardly as forces are applied and removed. The top of the tank "oilcans" in that it also repeatedly collapses and expands. These small, repeated movements result in the tank eventually pulling away from the internal baffles or the end of longitudinal welds fail. In either case, leaks develop which, in the case of fuel storing tanks, can be extremely dangerous. Another common failure is for the top and bottom walls to inwardly collapse due to the oil-canning" effect.

The unique design of the present invention acts to oppose these stresses in the following manner: Upon impact or movement of the liquid high internal pressure forces act against the exterior surfaces 28 and 28' of the baffles, causing them to tend to deflect toward the tank end resolving the pressure into thrust applied outwardly against the tank walls at top and bottom where the baffles are secured thereto. This opposing thrust effectively acts to resist the tendency of the tank to collapse. The novel pressure responsive arch-shaped baffle is adaptable to almost any tank shape and greatly increases tank strength and life in service.

In order to test the effectiveness of my unique tank design, the following test was run which is a recommended standard set forth by the Boating Industry Association for marine fuel tanks:

A number of conventionally constructed elongated tanks having a rectangular cross section and being about 27 gallons capacity were constructed of 16 ga. sheet metal. Two conventional baffles of 18 ga. were arranged with each of the tanks and were welded to the tank interior on all four sides. The tanks filled with liquid were repeatedly dropped from sufficient height so that the weight of the liquid imposed over 27 g's in the vertical direction and at least 1 g horizontally as measured by an impact-measuring instrument. The tremendous impact pressure generated by these forces caused the tank of standard construction to fail and leak before the completion of 300 cycles in most cases, and generally completely fail by collapsing at the tank midsection.

The identical impact test was then performed on tanks of the same capacity and size, also of 16 ga. sheet metal. These tanks were provided with 18 ga. metal internal baffles constructed and installed according to the present invention. In almost every instance, after 1,000 cycles no leaks were detectable and the tanks welds were intact. The novel baffles assisted in absorbing internal pressure by resisting the tendency of the tank to "oilcan" and provided strength and rigidity.

It will be obvious to those skilled in the art that various changes and modifications in the tank design described herein can be made without departing from the spirit and scope of the appended claims and to that extent are a part of the present invention.

Having described my invention with sufficient clarity so that those skilled in the art may construct and use it, I claim:

1. A baffle arrangement for use in connection with a liquid containing tank having end and sidewalls comprising:
    a first flexible baffle member of generally arch-shaped cross section transversely spanning the tank interior,
    said first baffle including at least a pair of angular sections directed toward a first end wall and terminating adjacent opposite sidewalls of the tank,
    said first baffle being secured to said tank walls only along opposite edges of the span formed with said angular sections,
    a second flexible baffle member of generally arch-shaped cross section spanning the tank interior at a zone longitudinally spaced from said first baffle,
    said second baffle including at least a pair of angular sections directed toward a second end wall of the tank and terminating adjacent opposite sidewalls of the tank,
    said second baffle being secured to said tank walls only along opposite edges of the span formed with said angular sections,
    said first and second baffles each having associated therewith means for permitting a flow of liquid along said tank,
    said first and second baffles being arranged structurally independent of each other except for the tank sidewalls to which they are secured to work independently of each other under forces in said tank,
    whereby the opposed arched baffles support said tank by resolving internal pressure forces into thrust against the tank walls to oppose the tending of the tank to collapse upon movement of the liquid therein.

2. The baffle arrangement of claim 1 wherein said first and second baffles each include a pair of side sections terminating in wear surfaces adjacent opposite sidewalls of the tank.

3. The baffle arrangement of claim 1 wherein said first and second baffles are symmetrically disposed in said tank with respect to the axial center of said tank.

4. The baffle arrangement of claim 1 wherein said first and second arch-shaped baffles have generally curved cross sections.

5. A baffle arrangement for use in connection with a liquid-containing tank of generally rectangular cross section having end, side and top and bottom walls comprising:
    a first flexible baffle member having a flat surface portion transversely spanning said tank perpendicular to the longitudinal axis of said tank,
    said flat portion having a pair of angular sections located respectively at the top and bottom edge and extending toward the one tank end wall and terminating in a pair of flanges conforming to and adjacent the tank top and bottom wall,
    said flanges being secured to said tank top and bottom wall;
    a second flexible baffle arranged structurally independent of said first baffle and disposed in said tank parallel to and longitudinally spaced from said first baffle,
    said second baffle having a flat surface portion transversely spanning in said tank perpendicular to the longitudinal axis of said tank,
    said flat portion having a pair of angular sections located respectively at the top and bottom edge extending toward the other end wall of said tank and terminating in a pair of flanges conforming to and adjacent the tank top and bottom wall,
    said flanges being secured to said tank top and bottom wall whereby said baffles serve as a support for said tank by resolving internal pressure forces into thrust against the tank walls to oppose the tendency of the tank to collapse.

6. The baffle arrangement of claim 5 wherein said flat portion of said first and second baffles are provided with a wear lip parallel and adjacent to the tank sidewalls.

* * * * *